Patented Feb. 25, 1930

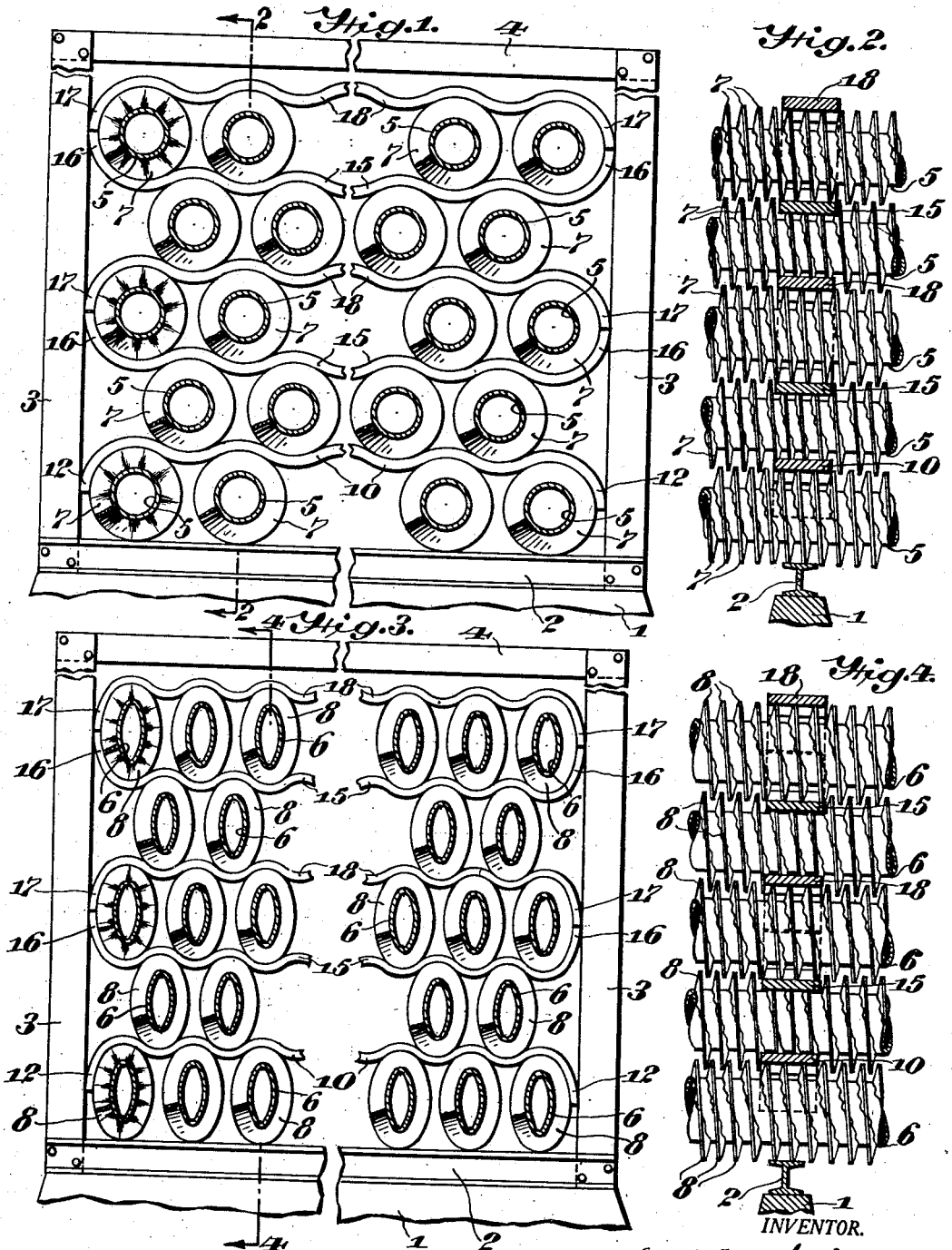

1,748,140

UNITED STATES PATENT OFFICE

KARL MUHLEISEN, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA

MEANS FOR SUPPORTING AND HOLDING PIPES IN SPACED RELATION TO EACH OTHER

Application filed May 7, 1924. Serial No. 711,705.

In cases where pipes are employed in groups or bundles it frequently becomes necessary to support the same at one or more points intermediate their ends in order to prevent sagging and lateral displacement. If such pipes are smooth little difficulty is encountered, but in the case of pipes which are provided with exterior spiral coils some difficulty has been met in providing satisfactory means for supporting the same in such manner that any single pipe may be removed for repair or for any reason and reinserted without disturbing the other pipes of the group or bundle.
The general object of the present invention is to provide means whereby pipes provided with exterior coils and which are arranged in groups or bundles may be supported at one or more points intermediate their ends in such manner as to prevent sagging and lateral displacement thereof, and also so as to permit the removal of any single pipe with its coil or the insertion of any single pipe from or into the group or bundle without disturbing other pipes of the group of bundle.

It is also an object of the invention to provide novel supporting means whereby any pipe of a group or bundle of pipes with the spiral coil thereon may be removed or inserted without disturbing other pipes of the group or bundle whether such pipes be of circular or oval shape in cross section.

Other objects and advantages of the invention will be pointed out in the detailed description thereof which follows or will be apparent from such description.

In order that the invention may be readily understood and its practical advantages fully appreciated, reference should be had to the accompanying drawing in which I have illustrated one form of embodiment of the said invention.

In the drawing:

Fig. 1 is a view in cross section of a bundle of pipes which are circular in cross section, and showing the new and novel means embodying my invention for supporting the same at points intermediate their ends;

Fig. 2 is a sectional view taken on the line 2—2 of Fig. 1;

Fig. 3 is a view similar to that shown in Fig. 1 in which the pipes are of oblong shape in cross section and in which the coils are of like shape; and Fig. 4 is a sectional view taken on the line 4—4 of Fig. 3.

Referring to the drawing: 1 designates a support or pedestal upon the upper edge of which a beam 2 is mounted. Secured to the opposite ends of the said beam are upright posts or standards 3 to the upper ends of which the opposite ends of a cross bar 4 are connected for the purpose of providing a rigid frame structure within which the bundle of pipes is located.

The pipes 5 of circular shape in cross section shown in Figs. 1 and 2 and the pipes 6 of oblong shape in cross section shown in Figs. 3 and 4 are arranged in horizontal rows, as shown. The pipes 5 and 6 are respectively provided with spiral coils 7 and 8. The outlines of the coils 7 are circular as shown in Figs. 1 and 2, while the outlines of the coils 8 shown in Figs. 3 and 4 are oblong.

In both constructions the bottom row of pipes and coils are supported directly upon the upper edge of the supporting beam 2, the edges of the coils being in contact with the upper edge thereof. A sinuous or corrugated plate 10 rests upon the upper sides of the ribs 7 and 8. The outer ends of the said plate are bent downwardly as indicated at 12 so as to extend partially around the outer sides of the outer edges of the rims 7 and 8 of the outermost pipes. The outer sides of the downwardly extending end portions 12 preferably, though not necessarily, contact with the inner edges of the posts or standards 3. The second row of pipes with their spiral ribs are arranged in staggered relation with respect to the pipes and ribs of the bottom row and rest within the bends of the plate or strip 10 which extend part way down between the pipes in the lower row. Resting upon the upper sides of the coils of the second row of pipes is a corrugated plate 15 the opposite ends of which extend upwardly as indicated at 16 into juxtaposition to the depending ends 17 of a corrugated plate 18 which rests upon the upper side of the coils of the third row of pipes. The rows of pipes and intermediate corrugated strips or plates of sheet metal may be continued upwardly to such height as may be desired, the arrangement being repeated or duplicated as the height of the structure increases.

It will be seen that in the case of a construction embodying the invention any one of the pipes with the coil thereon, whether circular or oval in cross section, may be removed merely by pulling the same longitudinally or axially from the bundles of pipes and from between the corrugated plates or strips which separate adjacent rows of pipes.

The bottom row of pipes, as indicated, rests upon the sill or beam 2 but that fact does not interfere with the removal of any one of the pipes of the lower row by pulling the same longitudinally or axially from the bundle.

By providing the strips with corrugations as indicated it will be apparent that the pipes with the coils thereon are prevented from displacement laterally or in horizontal directions. It will also be understood that the weight supported by the lower rows of pipes need not be great because the only purpose of the structure is to prevent the sagging and lateral displacement of the pipes at points intermediate their opposite ends which are connected with and supported upon rigid supports, such as headers.

Having thus described my invention, what I claim and desire to secure by Letters Patent is:

In means for supporting a plurality of pipes intermediate their ends to prevent sagging and lateral displacement thereof, which pipes are arranged in horizontal rows, the said rows being located one above the other and the pipes of the respective rows being located in spaced and staggered relation with respect to the pipes of adjoining rows, corrugated metal strips extending transversely of the said pipes between said rows, the corrugations of said strips extending in opposite directions and projecting into the spaces between the adjacent pipes of adjoining rows, the opposite ends of said strips being bent laterally and contacting with portions of pipes in adjoining relation thereto to prevent lateral displacement thereof, and means with which the outer ends of said strips are in contact for preventing lateral displacement thereof.

In testimony that I claim the foregoing as my invention, I have hereunto signed my name this 1st day of May, A. D., 1924.

KARL MUHLEISEN.